(12) United States Patent
Kim et al.

(10) Patent No.: US 8,211,222 B2
(45) Date of Patent: Jul. 3, 2012

(54) INK COMPOSITION ROLL FOR PRINTING

(75) Inventors: Dae-Hyun Kim, Daejeon Metropolitan (KR); Jin-Woo Cho, Daejeon Metropolitan (KR); Dong-Myung Shin, Daejeon Metropolitan (KR); Ji-Su Kim, Busan (KR); Sung-Hyun Kim, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 134 days.

(21) Appl. No.: 12/451,702

(22) PCT Filed: Dec. 19, 2008

(86) PCT No.: PCT/KR2008/007562
§ 371 (c)(1),
(2), (4) Date: Nov. 25, 2009

(87) PCT Pub. No.: WO2009/082143
PCT Pub. Date: Jul. 2, 2009

(65) Prior Publication Data
US 2010/0136301 A1    Jun. 3, 2010

(30) Foreign Application Priority Data
Dec. 21, 2007  (KR) .................. 10-2007-0135723

(51) Int. Cl.
*C09D 11/00*  (2006.01)

(52) U.S. Cl. .................. 106/31.59; 106/31.89

(58) Field of Classification Search ............... 106/31.59, 106/31.89
See application file for complete search history.

(56) References Cited

U.S. PATENT DOCUMENTS

| | | | |
|---|---|---|---|
| 3,948,668 A * | 4/1976 | Hayek et al. ............... | 106/31.59 |
| 4,089,804 A * | 5/1978 | Falk .................................. | 516/9 |
| 4,304,601 A * | 12/1981 | Sharp ........................... | 524/261 |
| 6,051,629 A * | 4/2000 | Ichikawa et al. ............. | 523/161 |
| 6,465,540 B1 | 10/2002 | Kubo et al. | |
| 6,514,328 B1 * | 2/2003 | Katoh et al. ............... | 106/31.28 |
| 6,890,584 B2 * | 5/2005 | Leenders et al. ............... | 427/58 |
| 2006/0007287 A1 * | 1/2006 | Cagle et al. ................... | 347/100 |
| 2006/0258774 A1 | 11/2006 | Kim et al. | |
| 2007/0182796 A1 | 8/2007 | Ohkubo et al. | |
| 2007/0206045 A1 | 9/2007 | Umebayashi et al. | |

FOREIGN PATENT DOCUMENTS

| | | |
|---|---|---|
| KR | 10-0635153 | 6/2006 |
| KR | 10-0736531 | 9/2006 |

* cited by examiner

*Primary Examiner* — Jerry Lorengo
*Assistant Examiner* — Veronica F Faison
(74) *Attorney, Agent, or Firm* — McKenna Long & Aldridge LLP

(57) ABSTRACT

The present invention provides an ink composition for roll printing, which comprises one or more first fluorine surfactants that comprise a hydrophilic component, a lipophilic component, and a fluorine component; and one or more second fluorine surfactants that comprise a fluorine component, and any one of a hydrophilic component and a lipophilic component.

16 Claims, 3 Drawing Sheets

[Fig. 1]
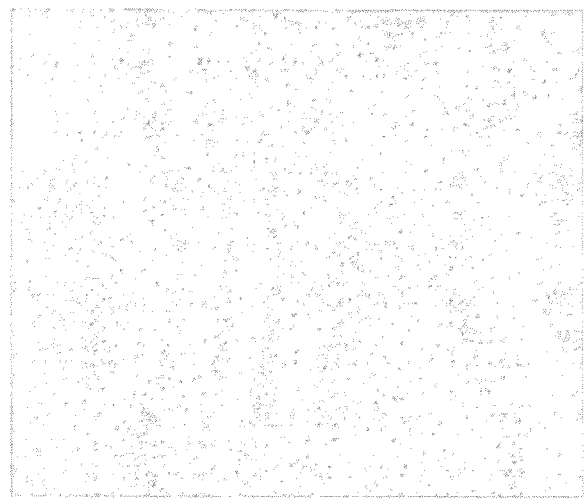
[Fig. 2]
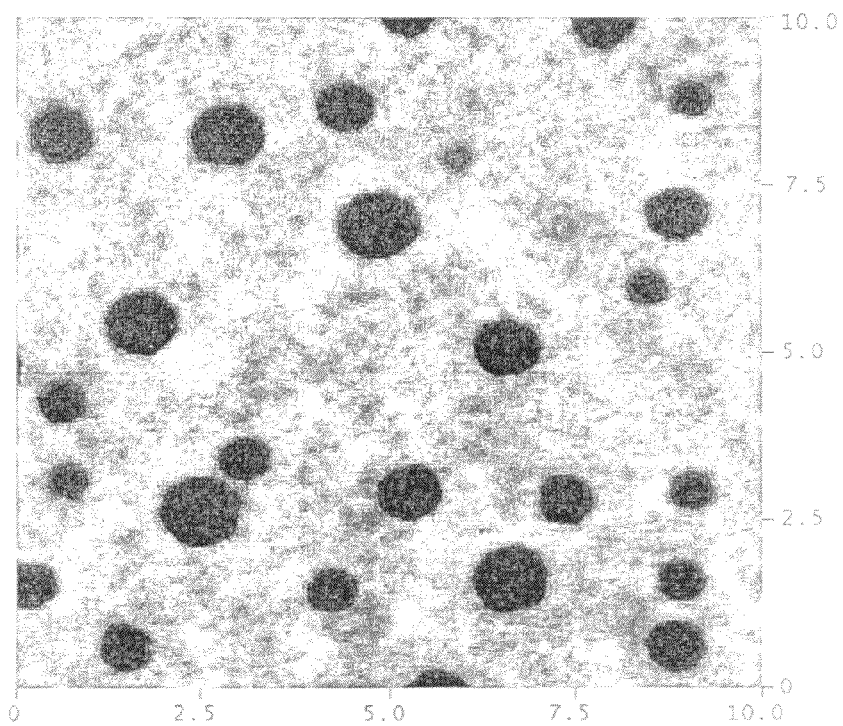

[Fig. 3]
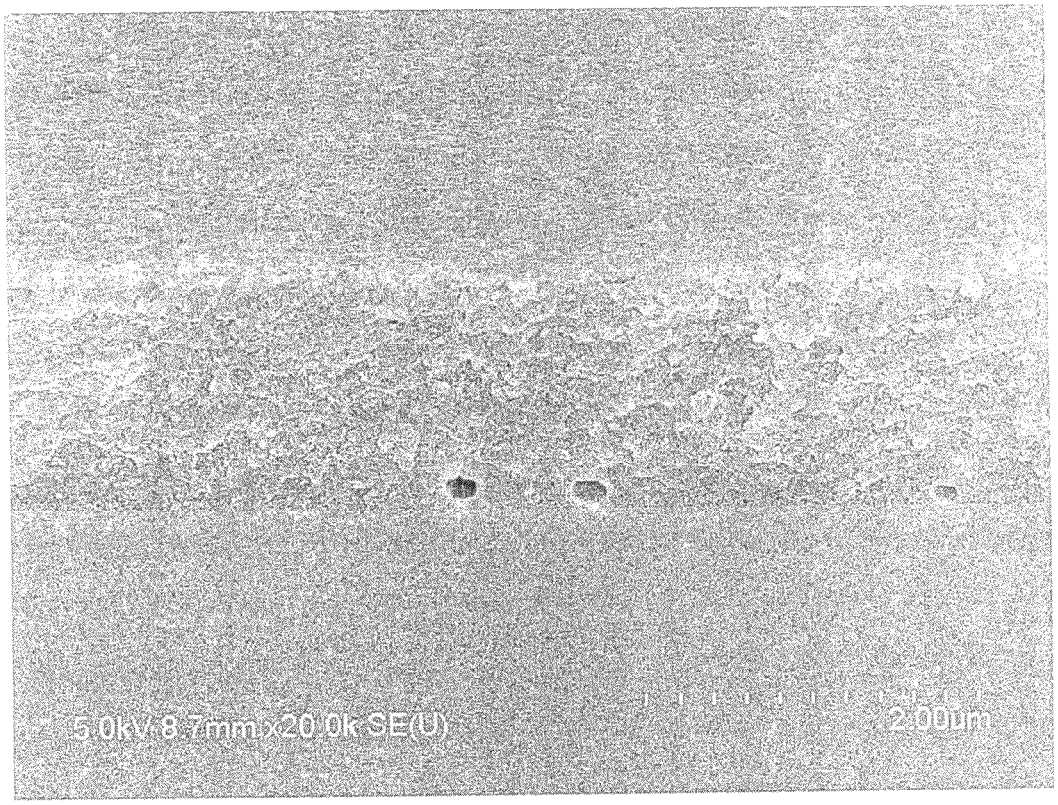

[Fig. 4]
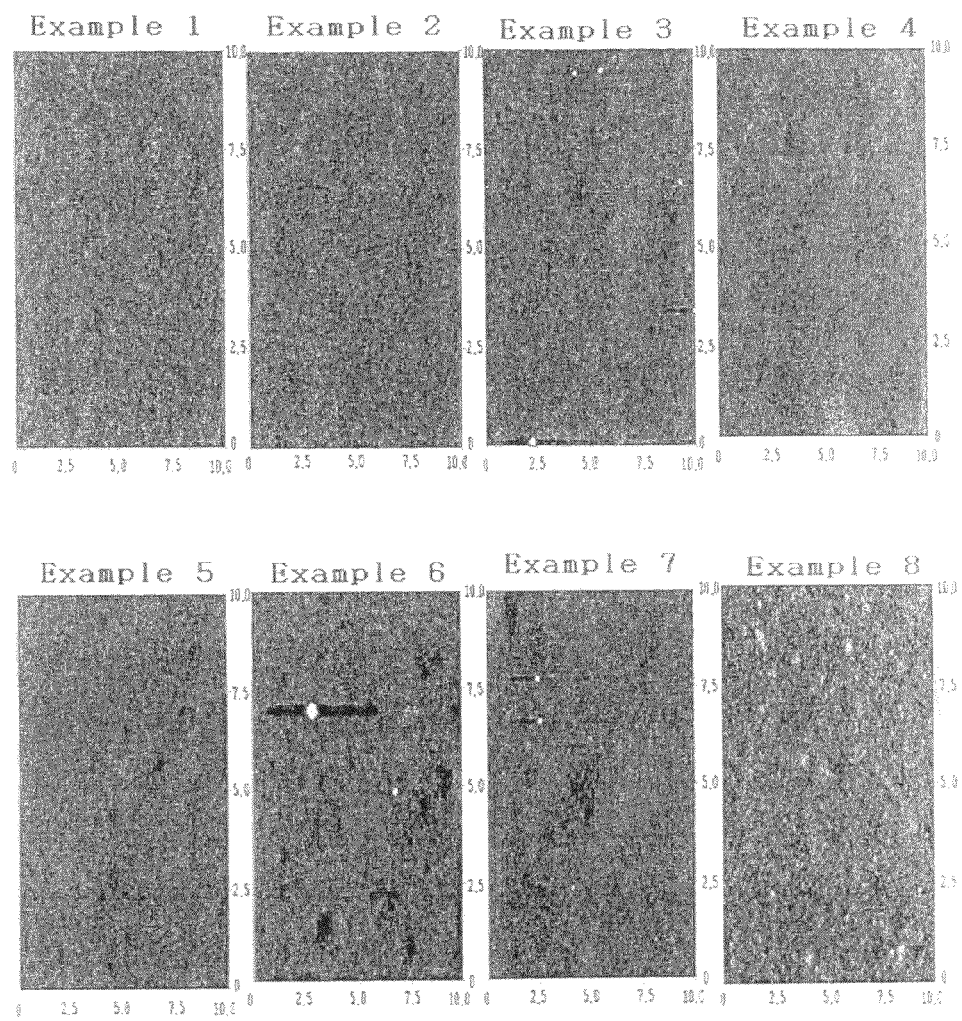

INK COMPOSITION ROLL FOR PRINTING

This application claims the benefit of PCT/KR2008/007562 filed on Dec. 19, 2008, along with Korean Patent Application No. 10-2007-0135723 filed on Dec. 21, 2007, both of which are hereby incorporated herein by reference for all purposes in their entirety.

TECHNICAL FIELD

The present invention relates to an ink composition for roll printing. More particularly, the present invention relates to an ink composition for roll printing, which comprises two or more surfactants having different properties.

This application claims priority from Korean Patent Application No. 10-2007-0135723 filed on Dec. 21, 2007 in the Korean Intellectual Property Office, the disclosure of which is incorporated herein by reference in its entirety.

BACKGROUND ART

A fine pattern that is used in a display device such as a semiconductor circuit device, LCD, and PDP is formed by photolithography using a photoresist. The photolithography has an advantage in that a desired pattern may be precisely obtained, but is disadvantageous in that many processes should be performed, many types of materials are used to maximize a photoresist effect, and a great amount of photoresist is used during processes such as coating.

Accordingly, currently, as a next generation process to overcome the disadvantages of the photolithography, a technology for obtaining a fine pattern by using a roll printing or inkjet printing method is suggested.

In the formation of the fine pattern by using the roll printing, various types of methods such as offset printing, reverse offset printing, roll-to-roll printing and the like may be used, and they may be extensively applied to colors of R (Red), G (Green), and B (Blue) that are constituent elements of a color filter, a BM (Black Matrix) pattern, a pattern for forming electrodes of thin film transistors (TFT) and plasma display panels (PDP), and pattern transferring of a partition material.

In the case of the reverse offset printing that is one of the representative roll printing process, a pattern is formed by three steps of coating ink from a coater to a blanket, transferring an undesired pattern from a blanket by a cliche, and transferring the pattern that remains on the blanket onto a glass substrate, and a roll printing device may generally include a coater, a roll, a roll driving device, a cliche or a substrate stage, and a driving device for aligning the stage as the most basic constituent element, a cliche and/or pipe washing device, a drying device for drying the blanket by absorbing a solvent absorbed on the blanket, and various types of sensor devices.

The degree of precision and a pattern transferring effect of a pattern that is formed by using the roll printing method largely depend on process conditions such as a coating state from a coater to a roll or a blanket of the roll, the degree of volatilization and a waiting time of a solvent before transferring onto the cliche or the substrate after the coating, and an impression pressure that is formed by an interval between the stage and the roll or the blanket during the transferring.

In particular, the uniformity of the entire pattern and formation of various types of stains are determined by a coating state during the coating onto the roll or the blanket that is a first step of the roll printing process. However, in general, since the blanket that is used in the roll printing is made of PDMS (polydimethylsiloxane) having the very low surface tension, in order to form the good coat film by coating ink thereonto, it is required that the surface tension of the ink is lower than that of PDMS.

Since PDMS generally has the surface tension of 24 mN/m or less, in order to desirably coat the ink onto PDMS of the blanket in roll printing, it is required that the surface tension of the ink is lower than 24 mN/m. However, since there is a limit in reduction of the surface tension by using a hydrocarbon surfactant or a silicon surfactant in order to set the surface tension of the ink to 24 mN/m or less, it is most preferable that the fluorine surfactant is used.

In general, in views of structure, the fluorine surfactant includes a fluorine component that has all hydrophobicity and lipophobicity and most largely affects the reduction of the surface tension and a hydrophilic component and a lipophilic component to improve compatibility to used solvents, various types of resins, pigments, and additives.

Therefore, the fluorine surfactant may be roughly classified into three categories: a surfactant that includes a fluorine component and a hydrophilic component, a surfactant that includes a fluorine component and a lipophilic component, and a surfactant that includes a fluorine component, a hydrophilic component, and a lipophilic component in views of constituent components according to a used system or a desired property. In addition, there is a fluorine surfactant that includes an ionic component.

Among them, as a fluorine surfactant that is capable of being used in electronic materials like ink for roll printing and largely affects reduction of the surface tension, the surfactant that includes the fluorine component and the lipophilic component, or the surfactant that includes the fluorine component and the hydrophilic component is most preferable.

However, in the case of them, in the structure of the surfactant, since there are the hydrophilic component or the lipophilic component in addition to the fluorine component having the hydrophobicity and the lipophobicity, the compatibility to other components that constitute the ink, for example, the pigment or the binder resin is reduced. Thus, there are problems in that a phase separation occurs, defoaming property is largely reduced, or holes are formed on a coating surface.

Therefore, among the fluorine surfactants, if a surfactant that includes the fluorine component and the lipophilic component and largely affects reduction of the surface tension or a surfactant that includes the fluorine component and the hydrophilic component is used in conjunction with a surfactant that includes the fluorine component, the hydrophilic component and the lipophilic component, the compatibility between pigments and binder resins constituting the ink and the fluorine surfactant is increased to largely reduce the surface tension. Accordingly, a coating property is improved in PDMS, defoaming property is improved, and problems such as the formation of holes on the surface may be solved.

In the ink for roll printing, in order to largely reduce the surface tension, in the case of when the fluorine surfactant that includes only the fluorine component and the hydrophilic component or the fluorine component and the lipophilic component and largely affects reduction of the surface tension is added, the coating property is excellent, but there is a problem in that the compatibility to other materials included in ink is reduced. Therefore, since defoaming property is reduced, fine bubbles that are not easily removed are formed, and holes having the puddle shape are formed on the coating surface of ink due to the fine bubbles.

Therefore, in order to solve this, if a surfactant other than the fluorine surfactant that includes only the fluorine component and the hydrophilic component or the fluorine component and the lipophilic component, that is, a hydrocarbon surfactant or a silicon surfactant, or a surfactant that includes all the fluorine component, the hydrophilic component and the lipophilic component among the fluorine surfactants is used, the compatibility is increased, thus improving defoaming property and suppressing the formation of holes on the coating surface. However, since the coating property is poor, there is a problem in that the ink is not desirably coated on the blanket during the roll printing.

DISCLOSURE

Technical Problem

It is an object of the present invention to provide an ink composition for roll printing, which suppresses the occurrence of holes on a coating surface and provides excellent coating property to desirably improve a color property and physical properties of a coating film, by adding one or more first fluorine surfactants that comprise a hydrophilic component, a lipophilic component, and a fluorine component for providing excellent defoaming property so that holes are not formed after ink is coated; and one or more second fluorine surfactants that comprise the fluorine component and any one of the hydrophilic component and the lipophilic component having a high effect for reducing surface tension of the ink and providing excellent coating property.

Technical Solution

The present invention provides an ink composition for roll printing, which comprises one or more first fluorine surfactants that comprise a hydrophilic component, a lipophilic component, and a fluorine component; and one or more second fluorine surfactants that comprise a fluorine component, and any one of a hydrophilic component and a lipophilic component.

There is provided a pattern that is produced by using the ink composition for roll printing according to the present invention.

There is provided a substrate on which the pattern according to the present invention is formed.

There is provided an electronic device which comprises the pattern according to the present invention.

Advantageous Effects

According to the present invention, holes may be formed on a coating surface by a surfactant that is added to maintain low surface tension of an ink composition, and thus, in order to prevent a phenomenon in which a color property and physical properties of an ink coating film are reduced, a first fluorine surfactants that comprise a hydrophilic component, a lipophilic component, and a fluorine component; and a second fluorine surfactants that comprise a fluorine component, and any one of a hydrophilic component and a lipophilic component are used while being mixed with each other. Thereby, since generation of the holes on the coating surface may be suppressed and excellent coating property may be provided, a color property and physical properties of the coating film may be desirably improved.

DESCRIPTION OF DRAWINGS

FIG. 1 is a microscopic picture (×1000) of a surface after an ink composition according to Comparative Example 6 is coated on a glass substrate;

FIG. 2 is a AFM (Atomic Force Microscopy) picture (Z=50 nm) of a surface after an ink composition according to Comparative Example 6 is coated on a glass substrate;

FIG. 3 is a SEM (Scanning Electron Microscope) picture (×20,000) of a section after an ink composition according to Comparative Example 6 that is coated on a blancket of a roll printing device is transferred on a glass substrate; and FIG. 4 is a AFM (Atomic Force Microscopy) picture of a surface after an ink composition according to Example 1 to Example 8 of the present invention is coated on a glass substrate.

BEST MODE

An ink composition for roll printing according to the present invention comprises one or more first fluorine surfactants that comprise a hydrophilic component, a lipophilic component, and a fluorine component; and one or more second fluorine surfactants that comprise a fluorine component, and any one of a hydrophilic component and a lipophilic component.

The fluorine surfactant according to the present invention is a fluorine component that has hydrophobicity and lipophobicity and plays the most important role of reducing surface tension, comprises a perfluoroalkyl group having a structure of $C_nF_{2n+1}$, and may comprises a hydrophilic group and/or a lipophilic group to increase the compatibility to the constituent component according to a property of constituent component that is comprised in a mixture such as ink in which the fluorine surfactant is used.

In detail, the first fluorine surfactant is a compound which comprises an oligomer having a hydrophilic group, an oligomer having a lipophilic group, and an oligomer having a perfluoroalkyl group in one molecular structure of the surfactant.

Here, the second fluorine surfactant is a compound which comprises an oligomer having a perfluoroalkyl group and any one of an oligomer having a hydrophilic group and an oligomer having a lipophilic group in one molecular structure of the surfactant.

Here, the lipophilic group is mostly an alkyl group, and may comprise one or more that are selected from the group consisting of an linear chained alkyl group having 8 to 20 carbon atoms, in which a length of a molecule is long; a branched chained alkyl group having 8 to 20 carbon atoms; an alkyl benzene group having 8 to 21 carbon atoms and various substituents; an alkyl naphthalene group having 3 or more carbon atoms; a fluoroalkyl group in which fluorine is partially substituted; a polydimethylsiloxane group; and a derivative of polyoxypropylene glycol. In general, the lipophilicity is increased as the number of carbon atoms is increased.

The hydrophilic group comprises a hydroxyl group (—OH) or an ether linkage (—O—), and may be roughly divided into a polyethyleneglycol type and a polyhydric alcohol type.

Examples of the polyethyleneglycol type comprise a reaction product of high alcohol and ethylene oxide, a reaction product of alkylphenols and ethylene oxide, a reaction product of high fatty acid and ethylene oxide, a reaction product of fatty acid ester of polyhydric alcohol and ethylene oxide, a reaction product of oil, fatty acid and ethylene oxide, and a reaction product of polypropylene glycols and ethylene oxide.

Examples of the polyhydric alcohol type comprise a esterification reaction product of glycerol and fatty acid, a esterification reaction product of pentaerythritols and fatty acid, a esterification reaction product of sorbitol, sorbitan, and fatty acid, a esterification reaction product of saccharides and fatty acid, alkyl ethers of polyhydric alcohol, and fatty acid amides of alkanolamine.

The fluorine component is an oligomer that has a perfluoroalkyl group, and a representative example thereof is alkylated perfluoroalkyl alkanes.

As the first fluorine surfactant that comprises the hydrophilic component, the lipophilic component, and the fluorine component, one or more selected from F-470, F-471, F-472SF, F-474, F-475, R-30, F-477, F-478, F-479, F-486, MCF-350SF, BL-20, R-61, and R-90 manufactured by DIC (DAINIPPON INK & CHEMICALS, Japan) may be used. However, it is not limited thereto.

As the second fluorine surfactant that comprises the fluorine component and any one of the hydrophilic component and the lipophilic component, one or more selected from F-480SF, F-484, F-482, F-483, F-487, F-172D, TF-1441, TF-1442, and F-178K manufactured by DIC may be used. However, it is not limited thereto.

Here, F-480SF and F-484 are the second fluorine surfactant that comprises the hydrophilic component and the fluorine component, and F-482, F-483, F-487, F-172D, F-178K, TF-1441 and TF-1442 are the second fluorine surfactant that comprises the lipophilic component and the fluorine component.

In the second fluorine surfactant, since the content of the fluorine component showing all hydrophobicity and lipophobicity properties is high, a phase separation may occur in respects to other components constituting the ink, for example, a solvent and a binder resin, a dispersing agent and the like.

On the other hand, in the first fluorine surfactant, since the content of the fluorine component is relatively low as compared to the second fluorine surfactant and it comprises all the hydrophilic component and the lipophilic component, the compatibility to components constituting the ink is good, thus a phase separation does not occur.

Accordingly, if the first fluorine surfactant that comprises the hydrophilic component, the lipophilic component, and the fluorine component is added to, for example, the second fluorine surfactant that comprises the hydrophilic component and the fluorine component, the compatibility of two surfactants is increased by the hydrophilic component of the first fluorine surfactant and the second fluorine surfactant, and the compatibility to other components of the ink is increased by the first fluorine surfactant that is mixed with it.

In addition, if the first fluorine surfactant that comprises the hydrophilic component, the lipophilic component, and the fluorine component is added to, for example, the second fluorine surfactant that comprises the lipophilic component and the fluorine component, the compatibility of two surfactants is increased by the lipophilic component of the first fluorine surfactant and the second fluorine surfactant, and the compatibility to other components of the ink is increased by the first fluorine surfactant that is mixed with it.

As described above, in the ink composition for roll printing according to the present invention, if one or more first fluorine surfactants that comprise the hydrophilic component, the lipophilic component, and the fluorine component, and one or more second fluorine surfactants that comprise the fluorine component and any one of the hydrophilic component and the lipophilic component are used while being mixed with each other, since it is easy to coat the ink on the blancket, the coating property is improved, and the defoaming property is improved. Thus, holes are not formed on the coating surface.

Here, the first fluorine surfactant that comprises the hydrophilic component, the lipophilic component, and the fluorine component is added in an amount in the range of 0.03 to 0.3 parts by weight on the basis of 100 parts by weight of the ink composition for roll printing, and the second fluorine surfactant that comprises the fluorine component and any one of the hydrophilic component and the lipophilic component may be added in an amount in the range of 0.03 to 0.3 parts by weight on the basis of 100 parts by weight of the ink composition for roll printing.

The weight ratio of the addition amount of the first fluorine surfactant to the addition amount of the second fluorine surfactant may be in the range of 0.1 to 1. This means a ratio of parts by weight of the first fluorine surfactant to parts by weight of the second fluorine surfactant (first fluorine surfactant/second fluorine surfactant).

For example, in the case of when the second fluorine surfactant is added in an amount of 0.3 parts by weight, since the first fluorine surfactant is added in an amount in the range of 0.03 to 0.3 parts by weight, a weight ratio of the addition amounts may be in the range of 0.1 (0.03/0.3) to 1 (0.3/0.3).

The ink composition for roll printing according to the present invention may comprise a first fluorine surfactant that comprises a hydrophilic component, a lipophilic component, and a fluorine component; a second fluorine surfactant that comprises the fluorine component and any one of the hydrophilic component and the lipophilic component, a resin binder, a crosslinking agent, a coloring agent, a dispersing agent and a solvent. In addition, the ink composition may further comprise at least one of a thermopolymerization initiator, a catalyst and an additional additive.

For example, the ink composition may comprises on the basis of 100 parts by weight of the ink composition for roll printing, 3 to 10 parts by weight of the resin binder; 5 to 15 parts by weight of the crosslinking agent; 3 to 12 parts by weight of the coloring agent; 65 to 85 parts by weight of the solvent; 1 to 5 parts by weight of the dispersing agent; 0.03 to 0.3 parts by weight of the first fluorine surfactant that comprises the hydrophilic component, lipophilic component, and fluorine component; and 0.03 to 0.3 parts by weight of the second fluorine surfactant that comprises the fluorine component and any one of the hydrophilic component and the lipophilic component.

In addition, it may further comprise at least one of 0.2 to 0.8 parts by weight of the thermopolymerization initiator; 0.1 to 0.5 parts by weight of the catalyst; and 0.05 to 2 parts by weight of the additional additive.

As described above, in the ink composition for roll printing according to the present invention, since it comprises all the hydrophilic component and the lipophilic component in conjunction with the fluorine component, the first fluorine surfactant that has the excellent compatibility and defoaming property to other components constituting the ink and prevents formation of holes on the coating surface, and the second fluorine surfactant that comprises the fluorine component and any one of the hydrophilic component and the lipophilic component to largely reduce surface tension, thus improving the coating property are used while being mixed with each other. Accordingly, the formation of holes on the coating surface is prevented, the excellent coating property is provided, and the good color property and physical properties of the coating film are provided.

Meanwhile, a pattern according to the present invention may be produced by using the ink composition for roll printing according to the present invention. That is, by printing the ink composition for roll printing according to the present invention on a substrate using a roll printing method, the pattern may be formed.

The pattern according to the present invention may be a color pattern of R (Red), G (Green), and B (Blue) which are constituent elements of the color filter; BM (Black Matrix) pattern which are constituent elements of the color filter; a pattern for forming a thin film transistor (TFT); a pattern for forming electrodes of plasma display panel (PDP); or a partition pattern of plasma display panel (PDP).

On the substrate according to the present invention, a pattern that is produced by using the ink composition for roll printing according to the present invention is formed.

Here, the substrate may be a color filter substrate of a liquid crystal display device; a thin film transistor substrate of a liquid crystal display device; or a substrate of a plasma display panel (PDP), but is not limited thereto. That is, by printing the ink composition for roll printing according to the present invention on the substrate using a roll printing method on a substrate, the pattern according to the present invention may be formed on the substrate.

An electronic device according to the present invention may comprise a substrate on which the pattern produced by using the ink composition for roll printing according to the present invention is formed.

Here, examples of the electronic device may comprise display devices such as a plasma display device, a liquid crystal display device, and a flexible display device in which a substrate is made of a polymer resin. However, it is not limited thereto.

Here, a plasma display device may comprise a front panel and a rear panel comprising a pattern for forming electrodes and a partition pattern produced by using the ink composition for roll printing according to the present invention.

A liquid crystal display device may comprise a color filter substrate that comprises a color pattern of R (Red), G (Green), and B (Blue) and a BM (Black Matrix) pattern produced by using the ink composition for roll printing according to the present invention; a thin film transistor substrate that is disposed to be opposite to the color filter substrate and comprises a pattern produced by using the ink composition for roll printing according to the present invention; and a liquid crystal layer that is formed in a space between the color filter substrate and the thin film transistor substrate.

MODE FOR INVENTION

A better understanding of the present invention may be obtained in light of the following Examples which are set forth to illustrate, but are not to be construed to limit the present invention.

Example 1

4.85 parts by weight of pigment blue 15:6 as the coloring agent, 5.588 parts by weight of the polymer (Mw=7,000) in which allylglycidyl ether was added to the copolymer where benzyl(metha)acrylate and (metha)acrylic acid were formed at a molar ratio of 70:30 as the resin binder, 10.4 parts by weight of dipentaerythritol hexaacrylate (crosslinking agent) as the functional monomer, 0.5 parts by weight of the azoamide thermopolymerization initiator (Vam-110, Wako Pure Chemical Industries. LTD), 1.67 parts by weight of the polyester dispersing agent that was the dispersing agent, 0.1 parts by weight of 3-methacryloxypropyltrimethoxysilane as the additive for improving adhesion strength, 0.15 parts by weight of F-487 as the second fluorine surfactant, 0.05 parts by weight of F-475 as the first fluorine surfactant, 41.442 parts by weight of propylene glycol monomethyl ether acetate as the solvent, 23.186 parts by weight of methyl ethyl ketone, 8.229 parts by weight of ethyl propanol, and 3.835 parts by weight of ethyl acetate were mixed with each other, and the mixture was agitated for 5 hours to produce the ink composition for roll printing.

Example 2 to Example 8

The ink composition for roll printing was produced by using the same method as Example 1, except that the kind and the content of the surfactant described in Table 1 were used.

Comparative Example 1 to Comparative Example 6

The ink composition for roll printing was produced by using the same method as Example 1, except that the kind and the content of the surfactant described in Table 1 were used.

TABLE 1

| | Ink for roll printing and properties according to the kind of the used surfactant | | | | |
| --- | --- | --- | --- | --- | --- |
| section | kind and content (parts by weight) of surfactant | coating state on glass substrate | coating on PDMS | defoaming property (hour) | ink surface tension (mN/m) |
| Comparative Example 1 | F-472SF 2.0 | No hole | No coating | 3 sec | 27.9 |
| Comparative Example 2 | F-475 2.0 | No hole | No coating | 5 min | 25.1 |
| Comparative Example 3 | TF-1441 2.0 | hole | good coating | 5 sec | 18.3 |
| Comparative Example 4 | TF-1442 2.0 | hole | good coating | 6 sec | 19.9 |
| Comparative Example 5 | F-172D | hole | good coating | 5 sec | 17.7 |
| Comparative Example 6 | F-487 | hole | good coating | 4 min | 20.0 |
| Example 1 | F-487 1.5 + F-475 0.5 | No hole | good coating | 20 sec | 19.5 |
| Example 2 | F-172D 1.0 + F-475 1.0 | No hole | good coating | 7 sec | 19.8 |

TABLE 1-continued

Ink for roll printing and properties according to the kind of the used surfactant

| section | kind and content (parts by weight) of surfactant | coating state on glass substrate | coating on PDMS | defoaming property (hour) | ink surface tension (mN/m) |
|---|---|---|---|---|---|
| Example 3 | F-487 1.0 + F-475 1.0 | No hole | good coating | 14 sec | 20.2 |
| Example 4 | TF-1441 0.5 + F-475 1.5 | No hole | good coating | 9 sec | 20.3 |
| Example 5 | TF-1442 0.5 + F-475 1.5 | No hole | good coating | 6 sec | 20.4 |
| Example 6 | F-172D 0.5 + F-475 1.5 | No hole | good coating | 6 sec | 20.6 |
| Example 7 | F-487 0.5 + F-475 1.5 | No hole | good coating | 10 sec | 21.0 |
| Example 8 | F-480SF 1.0 + F-475 1.0 | No hole | good coating | 15 sec | 18.4 |

*defoaming property: time required when ink surface starts to be observed by removing bubbles generated on the ink surface after 10 g of ink was put into the 25 ml glass bottle and the bottle was strongly shaken right and left ten times Through Table 1, it can be confirmed that as the fluorine surfactant that comprised the fluorine component, the hydrophilic component, and the lipophilic component, in the case of when only F-472SF (Comparative Example 1) was used, holes were not formed on the surface during the coating on the glass substrate, the defoaming property was excellent, and the coating was undesirably performed on PDMS.

In addition, in the case of F-475 (Comparative Example 2), as the fluorine surfactant that comprised the fluorine component, the hydrophilic component, and the lipophilic component, that relatively largely reduced the surface tension in comparison with F-472SF, the holes were not formed on the surface while coating was performed on the glass substrate. However, since the molecular weight thereof is large, it could be seen that the defoaming property was not good and the coating property on PDMS was poor.

On the other hand, as the fluorine surfactant that largely reduces the surface tension because the content of fluorine is high and comprises only the fluorine component and the hydrophobicity component, there are TF-1441 (Comparative Example 3), TF-1442 (Comparative Example 4), F-172D (Comparative Example 5), and F-487 (Comparative Example 6), and they largely reduce the surface tension. Thus, it can be seen that the coating property on PDMS is good but many holes are formed on the coating surface of the glass substrate.

FIGS. 1 and 2 are results that were obtained by observing a coating surface using a microscope and AFM (atomic force microscopy) after the blue ink using F-487 (Comparative Example 6) was coated on the glass substrate, and through this, it could be seen that many holes having the shape of puddle having the diameter of about 1 μm and the depth in the range of about 20 to 30 nm were formed.

In addition, after the ink composition according to Comparative Example 6 that was coated on the blancket of the roll printing device was transferred on the glass substrate, through the SEM (Scanning Electron Microscope) picture (see FIG. 3) of the section, in the case of the roll printing, since the pattern was obtained by using a method for transferring the ink on the glass substrate after the ink was coated on the blanket, when it was coated on the blanket, the upper surface and the lower surface were changed while it flew down to the interface with the substrate after it was transferred on the surface. At this time, it could be seen that pores having the diameter of about 0.2 μm were formed at the interface between the pattern and the glass substrate.

However, in the case of Examples 1 to 8 according to the present invention, since the ink composition for roll printing according to the present invention was produced by adding the first and the second fluorine surfactant having different properties and the first fluorine surfactant comprised the hydrophilic component, the lipophilic component, and the fluorine component; and the second fluorine surfactant comprised the fluorine component and any one of the hydrophilic component and the lipophilic component, through Table 1, it could be seen that the holes were not formed on the coating surface coated on the glass substrate, the coating property was excellent on PDMS, and the defoaming property was largely improved. This could be seen through FIG. 4 that illustrated the AFM picture of the coating surface that was coated on the glass substrate.

The invention claimed is:

1. An ink composition for roll printing, comprising:
   on the basis of 100 parts by weight of the ink composition,
   0.03 to 0.3 parts by weight of one or more first fluorine surfactants that comprise a hydrophilic component, a lipophilic component, and a fluorine component;
   0.03 to 0.3 parts by weight of one or more second fluorine surfactants that comprise a fluorine component, and any one of a hydrophilic component and a lipophilic component;
   3 to 10 parts by weight of a binder resin;
   5 to 15 parts by weight of a crosslinking agent;
   3 to 12 parts by weight of a colorant;
   1 to 5 parts by weight of a dispersing agent; and
   65 to 85 parts by weight of a solvent.

2. The ink composition for roll printing as set forth in claim 1, wherein the hydrophilic component comprises polyethyleneglycol that comprises a hydroxyl group or an ether linkage; or polyhydric alcohol.

3. The ink composition for roll printing as set forth in claim 1, wherein the lipophilic component comprises one or more that are selected from the group consisting of an linear chained alkyl group having 8 to 20 carbon atoms; a branched chained alkyl group having 8 to 20 carbon atoms; an alkyl benzene group having 8 to 21 carbon atoms; an alkyl naphthalene group having 3 or more carbon atoms; a fluoroalkyl group; a polydimethylsiloxane group; and a derivative of polyoxypropylene glycol.

4. The ink composition for roll printing as set forth in claim 1, wherein the fluorine component of one or more first fluorine surfactants and second fluorine surfactants comprises an oligomer having a perfluoroalkyl group.

5. The ink composition for roll printing as set forth in claim 1, wherein a weight ratio of the added amount of the first fluorine surfactant to the added amount of the second fluorine surfactant is in the range of 0.1 to 1.

6. The ink composition for roll printing as set forth in claim 1, wherein the ink composition for roll printing further comprises at least one of a thermopolymerization initiator, a catalyst and an additive for improving adhesion strength.

7. The ink composition for roll printing as set forth in claim 6, comprising:
  on the basis of 100 parts by weight of the ink composition for roll printing,
  0.2 to 0.8 parts by weight of the thermopolymerization initiator, 0.1 to 0.5 parts by weight of the catalyst and 0.05 to 2 parts by weight of the added additive for improving adhesion strength.

8. A substrate comprising a pattern on a surface of the substrate, wherein the pattern includes the ink composition according to claim 1.

9. The substrate as set forth in claim 8, wherein the pattern is any one of a color pattern for color filter, a BM (Black Matrix) pattern, a pattern for forming electrodes of thin film transistors (TFT), a pattern for forming electrodes of plasma display panels (PDP) and a pattern transferring of a partition material.

10. An electronic device comprising the substrate according to claim 8.

11. A substrate comprising a pattern on a surface of the substrate, wherein the pattern includes the ink composition according to claim 2.

12. A substrate comprising a pattern on a surface of the substrate, wherein the pattern includes the ink composition according to claim 3.

13. A substrate comprising a pattern on a surface of the substrate, wherein the pattern includes the ink composition according to claim 4.

14. A substrate comprising a pattern on a surface of the substrate, wherein the pattern includes the ink composition according to claim 5.

15. A substrate comprising a pattern on a surface of the substrate, wherein the pattern includes the ink composition according to claim 6.

16. A substrate comprising a pattern on a surface of the substrate, wherein the pattern includes the ink composition according to claim 7.

* * * * *